United States Patent [19]
Morse et al.

[11] 3,980,440
[45] Sept. 14, 1976

[54] CATALYST TUBE ASSEMBLY FOR STEAM-HYDROCARBON REFORMER

[75] Inventors: David C. Morse, La Jolla; William W. Howard, San Diego, both of Calif.

[73] Assignee: General Atomic Company, San Diego, Calif.

[22] Filed: Aug. 6, 1975

[21] Appl. No.: 602,198

[52] U.S. Cl. .............................. 23/288 M; 48/94; 48/196 A; 252/477 R
[51] Int. Cl.² .................... B01J 8/02; B01J 35/00
[58] Field of Search ............. 23/288 M, 288 R; 252/477 R, 477 Q; 196/110, 119, 120, 129, 133, 155; 48/197, 105, 94, 196 R, 196 A

[56] References Cited
UNITED STATES PATENTS

| | | | |
|---|---|---|---|
| 2,361,020 | 10/1944 | Gibb | 23/288 M |
| 3,656,913 | 4/1972 | Blaha et al. | 23/288 M |
| 3,899,420 | 8/1975 | Nozawa et al. | 23/288 M X |

FOREIGN PATENTS OR APPLICATIONS

| | | | |
|---|---|---|---|
| 1,098,622 | 1/1968 | United Kingdom | 252/477 R |

*Primary Examiner*—Joseph Scovronek
*Attorney, Agent, or Firm*—Fitch, Even, Tabin & Luedeka

[57] ABSTRACT

A steam-hydrocarbon reformer is provided having a catalyst tube assembly which includes an outer casing and a central coaxial inner tube within the casing. A column of stacked catalyst pellets surrounds the inner tube. An annular passageway is provided between the outer surface of the column of stacked catalyst pellets and the outer casing. The fluid containing the reactants and products flows in this annular passageway and through another passageway in the center of the inner tube.

12 Claims, 7 Drawing Figures

CATALYST TUBE ASSEMBLY FOR STEAM-HYDROCARBON REFORMER

The present invention relates to apparatus used in chemical reactions for the reforming of hydrocarbons, and more particularly to reforming apparatus of the type in which a catalyst is contained in a plurality of exteriorly heated tubes.

In a typical reforming process in which such apparatus is utilized, methane is catalytically reacted with steam at elevated temperatures to form hydrogen and oxides of carbon. The overall reaction is endothermic, and consequently a source of heat is required to externally heat the reaction tubes in which the input mixture of methane and steam is passed.

Heretofore, apparatus for this process has been provided that has included a group of reaction tubes containing a packed bed of catalyst pellets. Pellets for such apparatus have had an outer diameter between 0.5 to 1.0 inch. The inside diameter of each tube of necessity has been several times the pellet diameter to afford reasonable packing of the pellets.

One specific example of a catalyst pellet configuration that previously has been used is a ring having an outside diameter of ⅝ of an inch, an inside diameter of ⅜ of an inch, and a height of ½ inch. Reaction tubes containing a packed bed of such pellets have been between 4.5 and 6.0 inches in diameter. Such tubes are typically radiantly heated in reforming apparatus. These tubes are relatively large from the viewpoint of heat transfer, in that the process heat must penetrate all the way to the center of the packed bed of catalyst pellets. This size tube allows very little design freedom when it is desirable to increase the heat transfer area per unit volume such as in convective heat exchanger design.

It can be seen that when a heat exchanger tube field includes large numbers of these tubes in reformers, the reformers inherently are of large volumes, and from the standpoint of processing economics, it is desirable to accomplish the reforming in apparatus of smaller volume and save on such things as material costs and space requirements. This consideration becomes even more acute where an installation includes several such reformers in some geometric arrangement around a heat generator used in common by the reformers.

A disadvantage of the packed-bed reaction tube in this connection is that its physical properties simply prevent a substantial reduction in reformer volume. Another disadvantage of the packed-bed reaction tube is the resistance it offers to the flow of process gas, requiring elevated pressures for the process gas.

The present invention provides a catalyst pellet configuration and a catalyst tube assembly that affords an improved reformer construction.

It is an object of the present invention to provide improved apparatus useful in steam-methane reforming.

It is another object of the present invention to provide an improved configuration for catalyst pellets.

A further object of the present invention is to provide a catalyst tube assembly for a steam-hydrocarbon reformer having improved pressure drop characteristics.

It is still a further object of the present invention to provide a catalyst tube assembly for a steam-hydrocarbon reformer having a construction that affords constructing smaller volume reformers.

These and other objects of the present invention are more particularly set forth in the following detailed description and in the accompanying drawings of which:

Figure 1:
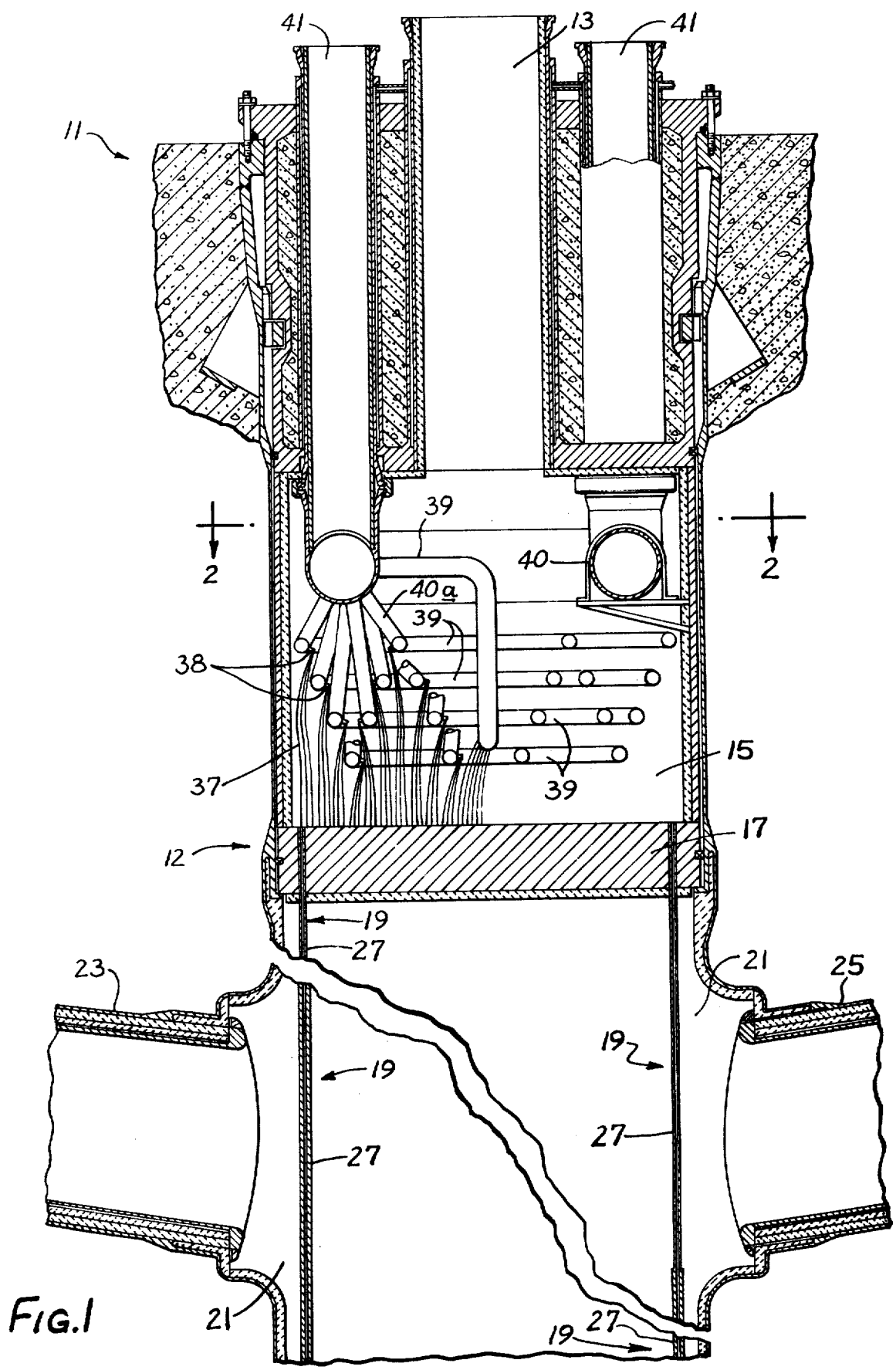
FIG. 1 is a partial vertical sectional view of a reformer constructed in accordance with the principles of the present invention, with portions broken away to more clearly illustrate certain features thereof.
Figure 6:
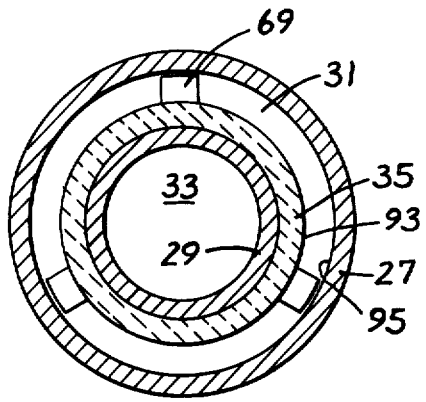
Figure 7:
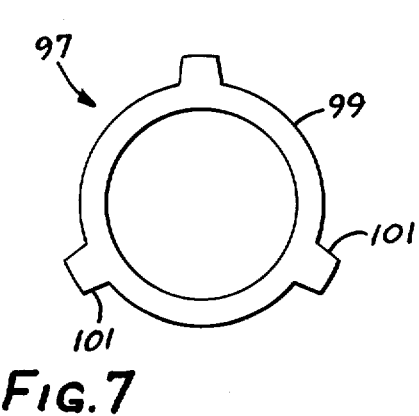
Figure 3:
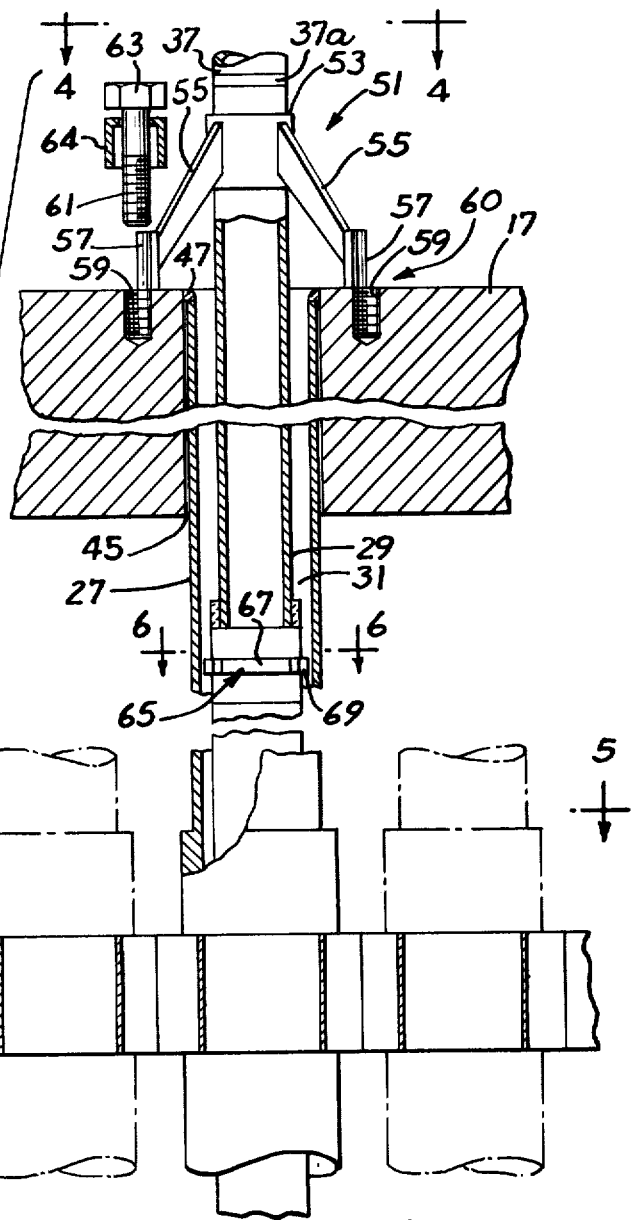
Figure 4:
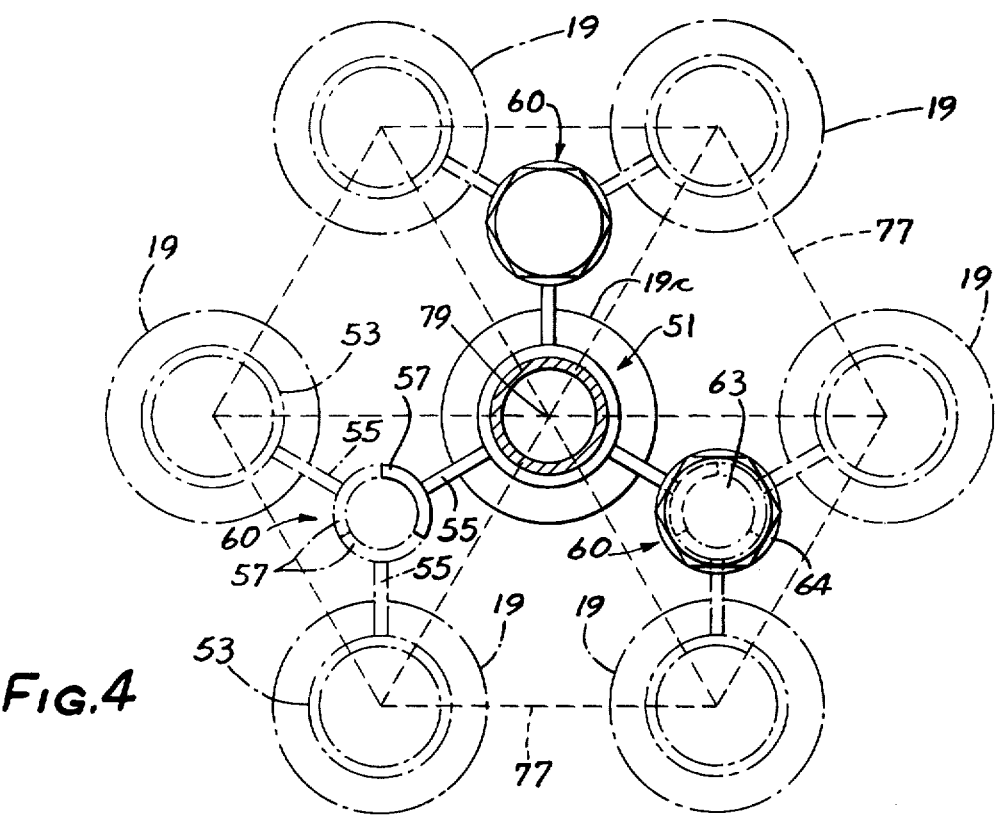
Figure 5:
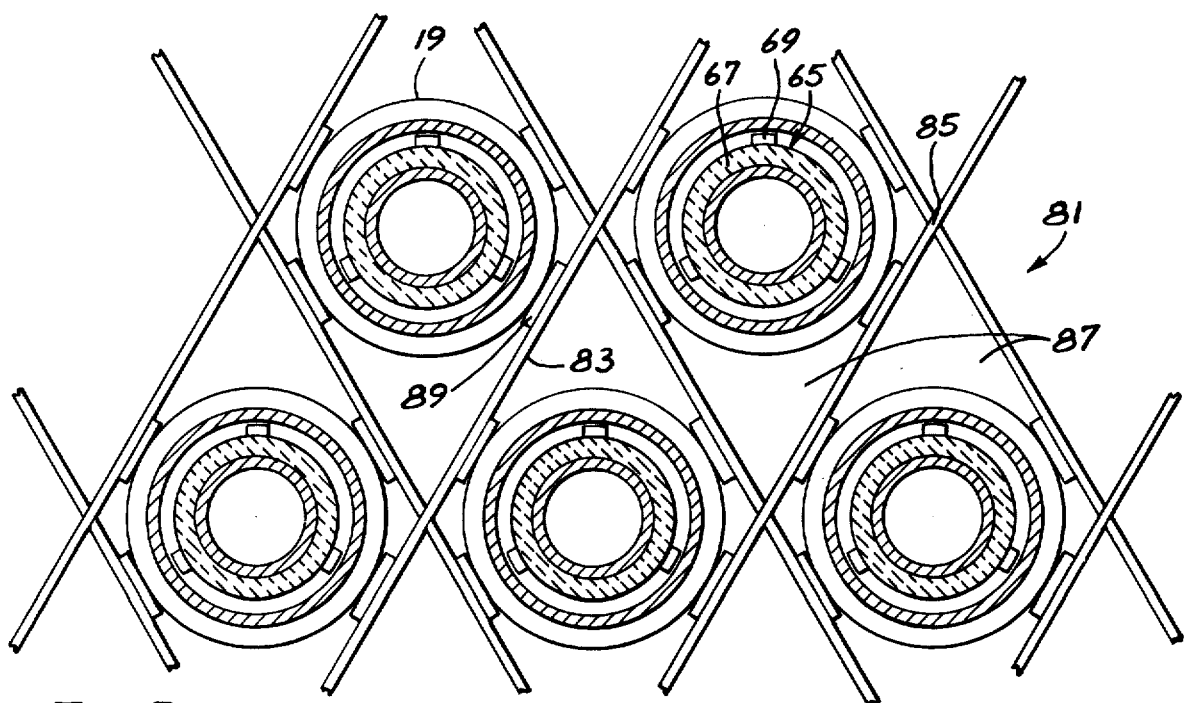

FIG. 3 is an enlarged vertical sectional view of a catalyst tube assembly constructed in accordance with the principles of the present invention for use in the reformer of FIG. 1 with portions deleted to maintain an enlarged scale for clarity of illustration and with a portion shown in elevation and like portions of adjacent assemblies shown in phantom along with a member providing lateral support for the tube assemblies;

FIG. 4 is a top view of a mounting for a part of the catalyst tube assembly taken substantially along the line 4—4 of FIG. 3 and including adjacent like assemblies shown in phantom to more completely illustrate the mounting arrangement and space relation thereof;

FIG. 5 is a sectional view of a few adjacent catalyst tube assemblies as mounted in the reformer of FIG. 1 and taken substantially along the line 5—5 of FIG. 3;

FIG. 6 is a sectional view taken substantially along the line 6—6 of FIG. 3 and illustrating one form of a centering device; and FIG. 7 is an alternative configuration of a catalyst pellet that may be used in the catalyst tube assembly of FIG. 3.

Referring first to FIG. 1 for a very general description of the preferred embodiment of the present invention, there is provided a reformer 11 having a housing 12 utilized for purposes of the present description of reacting steam with hydrocarbons to form hydrogen and oxides of carbon. The input mixture is introduced into the reformer through an access or inlet duct 13, which at its lower end is in fluid communication with a plenum 15. A plate or tubesheet 17 forms the lower wall of the plenum 15. From the tubesheet 17 are suspended a plurality of catalyst tube assemblies 19. For ease of illustration, the reformer 11 is illustrated in FIG. 1 as having only two catalyst tube assemblies, whereas in a full tube field of an operating reformer there may be thousands of such assemblies.

These tube assemblies 19 hang vertically from the tubesheet 17 and extend into a heating chamber 21 of the reformer. A heated gas, such as helium, is directed through the chamber 21 by way of an input duct 23 and an output duct 25. The input duct 23 enters the chamber 21 near the lower end of the tube assemblies 19, and the output duct 25 is near the top end of the chamber. Hot helium is thereby preferably circulated upwardly around the exterior of tubes 19 creating substantially an axial temperature gradient, and heat transfers from the helium to the tubes for elevating the temperature of the reactant fluids to bring about a reaction of the steam and hydrocarbon in the presence of a catalyst as described in detail hereinafter.

Referring now to FIG. 3, the catalyst tube assembly 19 includes an outer tube or casing 27 and an inner tube 29. An annular passageway 31 is defined between the outer surface of the inner tube 29 and the inner surface of the outer casing 27. The input gas mixture passes downwardly through the annular passageway 31 to the lower end of the outer casing 27, which is closed at 32. The inner tube 29 forms a central passageway 33 which serves as a return conduit for the reformed gas mixture. In surrounding relation with the inner tube 29 and along most of its length is a column of stacked catalyst pellets 35.

The reaction of the steam and hydrocarbon occurs, therefore, in the substantially unimpeded flow of these gases in the annular passageway 31 in the presence of the catalyst pellet 35 at an elevated temperature supplied exteriorly of the tube assemblies 19 by the hot helium.

Returning to FIG. 1, there are illustrated a plurality of semiflexible pigtails 37 that are welded at 37a to the upper end of the inner tubes 29 (FIG. 3) to form extensions of the inner tubes 29. A cluster of these pigtails join at a connector 38. These pigtails 37 and connectors 38 provide fluid communication of the inner tubes 29 with first toroidal manifolds 39 which join a second manifold or torus 40 via cross conduits 40a. Two discharge or outlet ducts 41 are joined to the manifold 40 for the withdrawal of the reformed products.

Figure 2:
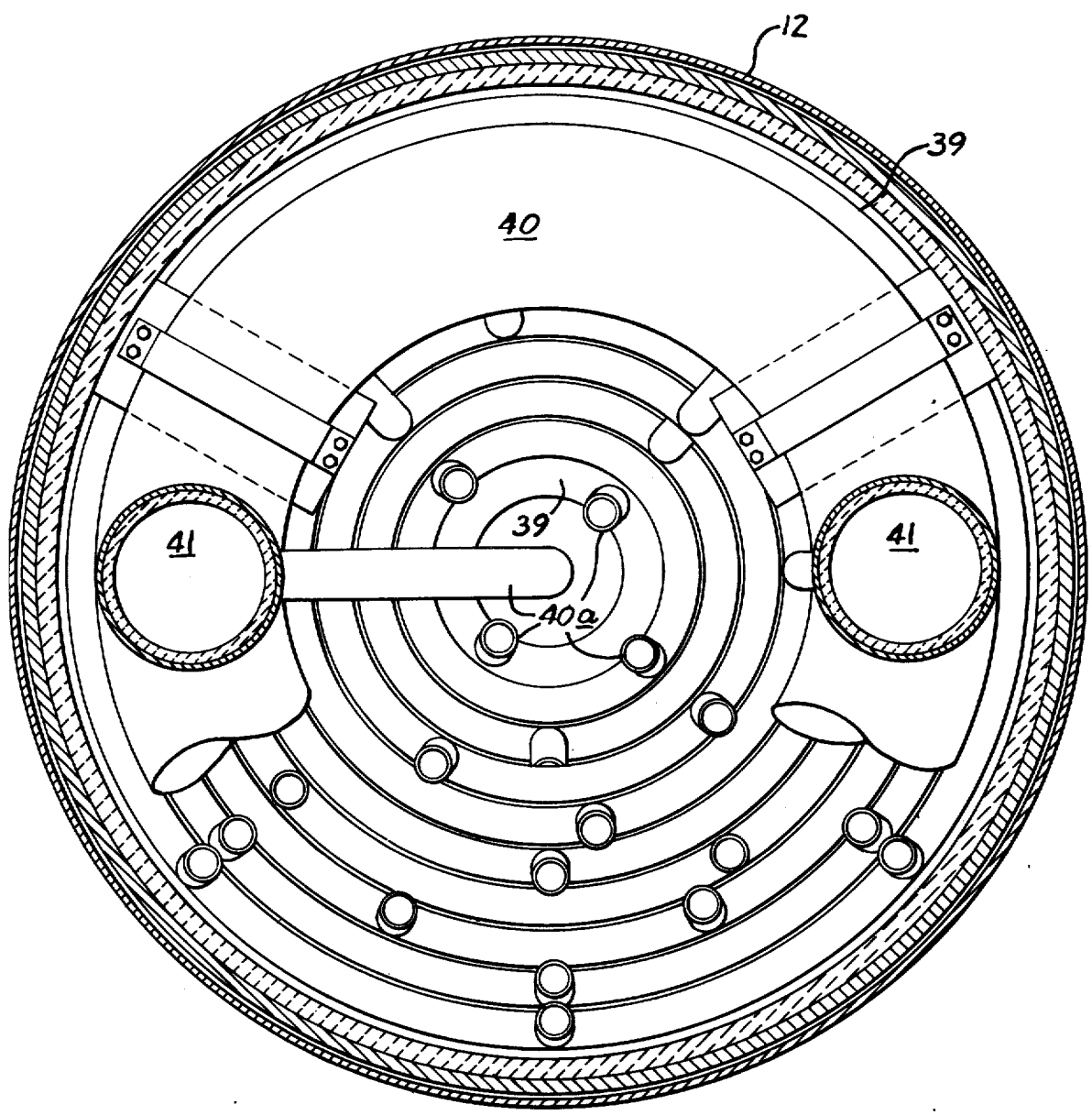
FIG. 2 is a sectional view taken substantially along the lines 2—2 of FIG. 1.

More specifically, the housing 12 is of circular configuration, as generally seen in FIGS. 1 and 2 and includes two principal portions separated by the generally horizontal tubesheet 17. Above the tubesheet is the plenum 15. For purposes of this description, this plenum is considered the input plenum. Within this plenum 15 are the first and second or toroidal manifolds 39 and 40, which for purposes of this description are considered the end product manifolds. Below the tubesheet 17 is the chamber 21 in which are suspended the catalyst tube assemblies 19. To simplify the present description, many details of construction of the reformer 11, including the materials used for such construction, are not provided herein because they are readily determinable in accordance with standard engineering practice and procedures conventionally employed in reformers.

The tubesheet 17 is quite thick and serves as a mounting plate for the catalyst tube assemblies 19 and serves to substantially reduce radiation from the chamber 21 to the manifolds 39 and 40.

As is best seen in FIG. 3, there is a vertical hole 45 through the tubesheet 17 for each catalyst tube assembly 19. The outer casing 27 is suitably joined to the top of the tubesheet 17 as by a weld 47 around the entire circumference of the opening. The weld 47 effects a seal between the plenum 15 (FIG. 1) and the chamber 21. This is the only point at which a seal need be made, for the outer casing 27 is not a straight through open tube, but is closed at its lower end as indicated at 32.

In the illustrated embodiment, the inner tube 29 is held in suspension in a coaxial relation within the outer casing 27 by a support 51 which includes a collar 53 suitably attached to the upper end of the inner tube 29. The support 51 further includes three legs 55 integrally associated with the collar 53 and extending downwardly from the collar and radially outwardly therefrom with 120° intervening each leg. A foot 57 is integrally associated with the lower end of each leg and is in the form of a segment of a cylinder. As best seen in FIG. 4, this segment is 1/3 of a circle (120°). A group of three mounting holes 59 are located in the tubesheet 17 equidistantly from the center of each hole 45 on radii extending outwardly with 120° intervening so as to coincide with the legs 55 to provide securing positions 60 for the inner tube 29. Turning now to FIG. 3, the mounting holes 59 are each threaded internally to receive a securing device, such as a bolt 61 having a hexagonal head 63.

Returning to FIG. 4, the feet 57 of three adjacent supports 51 fit together at each securing position 60 and form a complete mounting circle. A locking cap 64 (FIG. 3) fits over each group of contiguous feet at each mounting position 60 to lock the interfitting feet 57 in the mounting circle. The bolt 61 is inserted into the threaded mounting hole 59 and is tightened against the locking cap. The locking cap 64 is appropriately slotted in a skirt portion thereof to allow the cap to fit down over the arms 55 in securing the feet 57.

Turning to FIGS. 3 and 6, each inner tube 29 is centered and maintained in coaxial relation with the outer casing 27 by the support 51 at the top and by spiders 65 axially spaced along the length of the inner tube 29. Each spider 65 includes a catalytic body in the form of a ring 67 and three legs 69 (FIG. 6) extending radially outwardly at 120° intervals from the body.

It can be seen that the mounting arrangement for the inner tubes 29 just described provides expediency for inserting and removing the inner tubes from their central disposition within the outer casing 27. For example, the combining of three feet in a circular configuration at each securing position 60 reduces the number of mounting connections required and at the same time affords an equal spacing between adjacent catalyst tube assemblies 19, as will be discussed further hereinafter.

Turning now to FIGS. 1 and 3, as described earlier the upper end of the inner tubes 29 are connected via pigtails 37 to the first toroidal manifolds 39 of which there are a plurality. These tori or manifolds are concentric with respect to each other and are of decreasing diameter from the uppermost, away from the tubesheet 17, to the lowermost, adjacent the tubesheet. Thus, the tube assemblies 19 located toward the center of the tubesheet 17 are connected to the lowermost manifold 39, and the tube assemblies 19 located toward the periphery of the tubesheet 17 are connected to the uppermost manifold 39. The intermediate tube assemblies 19 are connected to the tori manifolds 39 that generally correspond to their diametral disposition in the tubesheet 17. The manifolds 39 are connected by transverse conduits 40a to the principal torus or second manifold 40, concentric with the manifolds 39, to which the pair of outlet ducts 41 are in communication. The concentricity of these manifolds is apparent in FIG. 2.

As best shown in FIG. 3, the inner tube 29 is open at its lower end and terminates at a point spaced above the closed lower end 32 of the outer casing 27. This spacing establishes a flow communication between the annular passageway 31 on the outside of the inner tube 29 and the central passageway 33 of the inner tube 29. The upper end of the annular passageway 31 is in flow communication with the plenum 15. The process gas flow preferably is a downward flow from the plenum 15 through the annular passageway 31 and then an upward flow through the central passageway 33 and into manifolds 39, although it should be understood that the direction of flow could be reversed. This preferred process gas flow coupled with the preferred axial flow of heating gas not only provides the true counterflow that is ideal for heat transfer, but allows the inner tube 29, as best shown in FIG. 3, to act as a recuperative heat transfer surface. This lowers the temperature of the process gas in 37 from the maximum reached at 32 and lowers the material design temperatures in the flow path from 37 onward. In addition, this recuperative action lowers the amount of heat transfer surface which must be supplied in 19 and raises the catalyst temperature.

Typically in a steam-hydrocarbon reformer, the steam and a hydrocarbon, such as methane, are reacted together in the presence of a catalyst, usually nickle oxide, and in the presence of heat. Contact of the process gas with the catalyst in the present instance is accomplished by the provision of pellets 35 (FIGS. 3 and 6) in the form of rings or small cylinders. These pellets 35 carry the catalyst and are stacked in a single column surrounding the exterior surface of the inner tube 29. The catalyst is thus independent of both the outer tube 27 and the inner tube 29. The pellets 35 are contiguous end for end, except where there are intervening spiders 65, and their outer surfaces form a generally continuous cylindrical surface that defines substantially the entire inner wall of the annular passageway 31. Thus, the process gas contacts the outer surfaces of the catalyst pellets as it passes through the annular passageway 31. This annular passageway is substantially free of obstruction, and there is relatively little resistance to impede the fluid flow. Only the legs 69 of the spiders 65 (FIG. 6) extend into the annular passageway 31. Such provision for the flow of reactants in the illustrated embodiment results in improved pressure drop characteristics over previously known reaction tubes, such as, for example, the reaction tube filled with randomly packed catalyst pellets of various shapes. Any agitation of the fluid that does exist is that which is caused by the legs 69 and is, of course, beneficial to the purpose of the catalyst by not allowing a laminar flow of the fluid, thus assuring a mixture of the fluid in the presence of the catalyst during the reaction without causing a high pressure drop.

As mentioned previously, the reaction is endothermic, and the heat is applied to the exterior of the catalyst tube assemblies 19 and secondarily through the recuperative action of the high temperature process gas flowing through the tube 29. In the preferred embodiment, this heat is supplied from the process heat of a high temperature gas reactor, the high temperature gas in the present instance being helium. It should be recognized, however, that the principles of the present invention need not be limited to reformers that are heated by high temperature gas. A fossil-fired furnace, for example, could be a source of heat for the endothermic reaction.

In the illustrated embodiment, it will be noted in FIG. 1 that the upper walls of the outer casings 27 are thinner in regions where the heating gas is in crossflow, i.e., in that region of the chamber 21 where the output duct 25 is located. The thinness of these tube walls occurs by the outside diameters of the walls being less in this region than it is in the axial flow portion of the heating chamber while the inside diameter remains constant throughout the length of the tubes. Accordingly, the resistance to the circulation and flow of the helium gas in the crossflow region of the chamber 21 is diminished and uniformity of heating gas flow generally around the tube assemblies 19 is insured.

Moreover, in carrying out the invention, the catalyst tube assemblies 19 are arranged within the chamber 21 so as to provide for more uniform heating of the exterior of these tubes. The arrangement is such that all adjacent tubes are equidistant from one another. This is accomplished in the illustrated embodiment by a layout best seen in FIG. 4, where the center of each tube assembly 19 is depicted as being in coincidence with vertices of equilateral triangles 77 illustrated by broken lines and formed between any three mutually ajacent assemblies 19. In the arrangement thereshown, the center tube assembly 19 is specifically indicated as 19c to distinguish it for purposes of description from the other tube assemblies. It will be noted in the illustrated embodiment that the center of tube assembly 19c is depicted as being in coincidence with the center of a hexagon formed by the association of six adjacent equilateral triangles. Thus, 19c is the nucleus of a cluster of adjacent tube assemblies 19 and its center which is indicated at 79, is equidistant from the centers of each adjacent tube assembly 19. It can be seen that by locating the tube assemblies so that any three mutually adjacent assemblies are at vertices of an equilateral triangle drawn therebetween, the equal length legs 55 meeting at a securing position 60 are like medians of the triangle 77 which intersect at their centers. Therefore, the securing position 60 is at the centroid of its associated triangle 77. For ease of illustration, only one such cluster has been shown, but it will be appreciated that the arrangement of the tube assemblies 19 in the tubesheet consists of a multiplicity of such clusters as depicted. Further, each assembly 19 is common to more than one such cluster. Consequently, any one tube assembly 19 is equidistant from all of its immediately adjacent tube assemblies 19.

This equal spacing of the tube assemblies 19 in the tubesheet 17 is maintained below in the heating chamber 21 by a lattice 81 placed at given intervals along the length of the suspended tube assemblies and providing lateral support for same. As shown in FIG. 5, this lattice 81 includes a framework of crossed strips 83 forming intersections 85 and interstices 87. The depending tube assemblies 19 are disposed within the interstices and their positions are maintained firm by the addition of pads 89 secured to the strips 83. Each lattice 81 causes the tube assemblies 19 to be fixed laterally with respect to each other and with respect to the outer wall of the heating chamber 21. As described earlier, the walls of the outer casings 27 are thicker below the region of the duct 25. The change in wall thickness is particularly evident in the cutaway portion at the center of FIG. 3. In the illustrated embodiment, each lattice 81 is located at equal intervals in the lower region of the tubes where the walls of the outer casings are thicker. Although the tube assemblies are locked laterally with respect to one another, they are not so tightly engaged by each lattice 81 that the tube assemblies cannot move vertically. Because these tube assemblies 19 are suspended from the tubesheet 17 and are hanging free without any supports at their closed ends 32, the tube assembly is free to expand and contract longitudinally as changes in temperature occur. The bottom wall (not shown) of the chamber 21, which is also the bottom wall of the housing 12, forms the inlet plenum for the heating gas coming from the input duct 23. The lower ends of the tube assemblies 19 extend downwardly to a point near the bottom wall, but not touching the same, with a space sufficient to allow for longitudinal expansion and contraction and adequate to allow for proper distribution of the heating gas from the input duct 23.

As mentioned previously, the configuration of the catalyst pellets 35 shown is in the form of a ring. This is best illustrated in FIG. 6 wherein the cross section of a catalyst pellet 35 is seen in its surrounding relation with the inner tube 29. This relation is established by placing the catalyst pellets 35 over the inner tube 29 from the top end to form a single column or stack of these pellets. It will be noted in FIG. 3 that the lower end of the inner tube 29 is enlarged to provide a shoulder 91 on which the column of pellets rests. the outer catalytic surface, designated 93, of the pellets 35 and the inside surface 95 of the outer casing 27 define substantially the annular passageway 31 through which the reactants flow. This annular passageway 31 is relatively thin and provides a relatively short radial path through the fluid stream for heat transfer. The agitation of the fluid caused by the centering legs 69 plus the normal turbulence created by the flow of the fluid in this narrow passageway assures the effectiveness of the catalyst surface 93 on the reactants without having to otherwise impede the fluid flow in the passageway 31. This structure also affords a greater catalytic surface area per unit volume of catalyst than is afforded by the prior forms of catalyst pellets utilized, for example, in random packing of tubes.

The catalyst pellets 35 may be formed in any conventional manner. For example, a core of ceramic material may be soaked in a solution of nickel nitrate, or other solution, so as to thoroughly impregnate the core. After impregnation, the pellet may be dried and then baked at a temperature of about 1000°F so as to convert the nitrate to the catalytically active nickel oxide. Of course, other conventional methods of impregnating the ceramic material may be used and, if desired, the catalyst may be deposited on the ceramic material as opposed to impregnation of the material. Moreover, other catalytic materials may be used depending on the intended use of the reformer.

When stacking the cylindrical pellets 35 on the inner tube 29, the spiders 65 are interspersed at predetermined intervals along the column of stacked pellets.

An alternative configuration of the catalyst pellet is shown in FIG. 7 where there is illustrated a pellet 97. This pellet 97 includes a circular body 99 having three legs 101 radiating outwardly from the center with 120° angles therebetween. These legs are of equal length from the center of the configuration so as to cause the inner tube 29 on which such pellets would be mounted to be centered, thus fulfilling the purpose provided by the spiders 65 described previously. The spiders 65, of course, would not be included in a column of such stacked pellets 97.

It can readily be seen that a column formed by a stack of pellets 97 would also provide for an annular passageway 31 when used in the catalyst tube assembly 19, although the passageway would be divided into three segments if the legs of all pellets in the column were aligned. The advantage of such a pellet configuration would lie in the additional catalytic surface that is exposed to the reactants, since the surface of the legs 101 would also be catalytically active. Furthermore, a stacked column of such pellets or a continuous catalyst tube or catalyst coated tube of the shape described might also be utilized for the inner central passageway 33 without an inner tube 29. Leakage between adjacent pellets might render such use of stacked pellets impractical. As can be seen from this alternative catalyst design, the catalyst configuration can be adapted to obtain optimum conditions.

Although the described embodiment is vertically oriented, it should be understood that the principles of the present invention would also be applicable to a structure horizontally oriented.

A detailed construction of the illustrated embodiment includes a steam-methane reformer provided in accordance with the principles of the present invention having an annular housing with its axis vertical. The upper portion, which includes the plenum 15, the manifolds 39 and 40, the access or inlet duct 13 and the discharge or outlet ducts 41, is approximately 24 feet high and twelve and one-half feet in diameter. The plenum 15 has an inside diameter of approximately 11½ feet and a height of approximately 10 feet. The principal torus or manifold 40 has an inside diameter of 2 feet. Below the manifold 40 are 10 toroidal manifolds 39 each having an outside diameter of approximately 6 inches. The transverse conduits 40a also have an outside diameter of approximately 6 inches. The inlet duct 13 has an inside diameter of approximately 3½ feet. The outlet ducts 41 each have an inside diameter of approximately 1¾ feet.

A tubesheet 17 forms the lower floor of the plenum 15 and is 24 inches thick. A 3-inch thick liner underlies the tubesheet. A heating chamber 21 extends approximately 42 feet below the tubesheet 17. The inside diameter of the helium input and output ducts 23 and 25 respectively is approximately 5¼ feet.

Suspended from the tubesheet 17 in the manner shown in FIG. 3 are 5,000 catalyst tube assemblies 19. The tube assemblies 19 are spaced such that the centers of adjacent tube assemblies are a distance of 1¾ inches apart. The centers of all adjacent tube assemblies 19 are equidistant from each other in the manner depicted in FIG. 4.

The portions of the outer casings 27 below the region of the output duct 25 have an outside diameter of approximately 1⅜ inches and an inside diameter of approximately 1 inch. The outside diameter in the region adjacent the output duct 25 is approximately 1⅛ inches, the tube wall thickness in this region being approximately 1/16 of an inch. The length of the outer casing tubes from the top surface of the tubesheet 17 to the outside of the closed ends 32 is approximately 43 feet. This provides a length of the outer casing extending below the tubesheet 17 of approximately 41 feet. The length of the thin wall portion of the outer casings 27 below the tubesheet 17 is approximately 11 feet. Six lattices 81 spaced at 5-foot intervals are utilized to secure the positions of the depending tube assemblies 19 below the region of the output duct 25.

Coaxial inner tubes 29 are suspended within the outer casings 27 in the manner shown in FIG. 3. Each inner tube 29 terminates at a point that is approximately ¾ inch from the lower inside end 32 of the outer casing. The column of stacked catalyst pellets 35 is approximately 40 feet long. There are eight spiders 65 located at approximately 5 feet intervals on each inner tube 29 to center the inner tube within each outer casing 27, each assembly 19 thus having its component tubes coaxial of each other.

Each catalyst pellet 35 is in ring form as shown in FIGS. 3 and 6. Each ring is approximately ½ inch high and ⅝ inch on its inside diameter. The outside diameter of each cylinder is approximately 13/16 of an inch.

Accordingly, with an inside diameter of the outer casing 27 being 1 inch and the outside diameter of the catalyst pellets 35 being 13/16 inch, there is provided an annular passageway 31 defined by these two surfaces that is 3/32 inch thick.

In operation, a mixture of steam and methane is introduced through the inlet duct 13 to the plenum 15 and flows downwardly through the annular passageways 31 in contact with the catalytic surfaces 93. Helium that has been elevated in temperature by the process heat of an adjacent high temperature gas reactor flows from the helium input duct 23 to the helium output duct 25 in surrounding relation and axially of the catalyst tube assemblies 29. This elevates the temperature in the heating chamber 21 to a level suitable for steam-hydrocarbon reforming to occur, normally between 1350° and 2000°F.

The reformed gases of hydrogen and oxides of carbon flow to the lower ends 32 of the outer casings 27 and up through the central passageways 33 of the inner tubes 29 to the toroidal manifolds 39 and 40 for withdrawal from the manifold 40 by the outlet ducts 41. By the time the reformed gases reach the manifolds 39, the temperature of the gases has cooled to a temperature ranging between 1200° to 1700°F.

For this configuration, the helium pressure drop is approximately 2.0 psi. The process gas pressure drop is approximately 75 psi from the inlet 13 to the bottom of the tube when the total pressure at the bottom 32 of the tube is 300 psi.

By contrast, a reformer using catalyst tubes, each having an outside diameter of four inches and an inside diameter of three inches and being packed with ring catalyst pellets having dimensions ⅝ × ⅝ × ⅝ inch will require 1,000 tubes. The length of each tube is 43 feet, and the process gas passes straight through the tubes into a lower manifold. the pressure drop of the process gas is approximately 283 psi. the overall length, top to bottom, of the housing is approximately 52 feet and the overall diameter of the housing is approximately 11½ feet. It is noted that this reformer with the same performance has a metal weight approximately 60 percent larger than the present preferred embodiment.

Thus, the many advantages of the present invention are easily seen. For example, it will be noted that the catalyst pellet configuration and catalyst tube assembly of the preferred embodiment provides an improved reformer construction for steam-methane reforming, affording improved pressure drop characteristics of the process gas and a substantially reduced reformer diameter. This pellet configuration permits stacking of the pellets in a column, the outer surface of which is spaced inwardly from the outer tube providing a thin annular passageway with improved heat transfer characteristics. The pellet configuration also permits a central coaxial inner passageway, and the plenum and manifolds then coexist at one end of the tube assembly, the manifolds being within the plenum. This construction affords a shorter reformer.

Thus, reduced reformer volume is a product of both a diminished diameter and a shorter length. Such reduced reformer volume is of particular significance because of the savings in material and space requirements, and such significance is even more acute in installations utilizing a plurality of reformers.

While the invention has been described in connection with a preferred embodiment, many alternatives, modifications, and variations may be apparent to those skilled in the art in view of the foregoing description. Accordingly, it is intended to embrace all such alternatives, modifications, and variations as fall within the scope of the appended claims.

Various features of the invention are set forth in the following claims.

What is claimed is:

1. A steam-hydrocarbon reformer comprising: a housing; a transverse tubesheet supported in said housing and forming a heating chamber threin on one side of said tubesheet; a plurality of parallel catalyst tube assemblies extending within and longitudinally of said housing with one end of each of said tube assemblies mounted on said tubesheet and extending therefrom into and substantially the entire length of the heating chamber, each assembly including an outer tube having an open end attached to said tubesheet and a closed opposite end and an associated central coaxial inner tube removably mounted within said outer tube by centering support means having securing points on said tubesheet independently of said outer tube, said coaxial inner tube having an open inner end spaced apart from the closed end of said outer tube; independently supported catalyst material carried on each said inner tube and extending circumferentially around a major portion of the outer surface thereof and spaced inwardly from the associated outer tube and defining therebetween an annular passageway for the conduction of fluids; means connective with the ends of said annular passageways adjacent the tubesheet for introducing reactant fluids therein; means connective with ends of said coaxial inner tubes adjacent the tubesheet for withdrawing reaction products from said catalyst tube assemblies; means for circulating heating fluid around the external surface of said outer tubes at a temperature such that reactant fluids within said annular passageways are heated to the steam reforming reaction temperature and a support means extending transversely of said housing and located in the heating chamber intermediate the length of said assemblies, said outer tubes being in sliding engagement with said support means for maintaining the parallel relation of said assemblies without impairing the longitudinal expansion of said tubes and without substantially affecting the circulation of the heating fluid.

2. A steam-hydrocarbon reformer comprising: an annular housing mounted with its axis vertical; a transverse tubesheet supported in said housing and forming a heating chamber below said tubesheet; a plurality of catalyst tube assemblies having one end of each mounted on said tubesheet and extending therefrom into the heating chamber vertically and parallel to one another to a point near the bottom of the heating chamber and positioned therein such that each tube assembly is equidistant from all adjacent tube assemblies, each tube assembly including an outer tube having an open upper end attached to said tubesheet and a closed lower end and an associated central coaxial inner tube removably mounted within the outer tube by centering support means having securing points on said tubesheet independently of said outer tube, said coaxial inner tube being open at its lower end and spaced above the bottom of said outer tube; independently supported catalyst material carried on each said inner tube and extending circumferentially around a major portion of the outer surface thereof and spaced inwardly from the associated outer tube and defining therebetween an annular passageway in each assembly for the conduction of fluids; inlet means in communication with the upper end of each said annular passageway for introducing reactant fluids therein; outlet means connective with the upper ends of said coaxial inner tubes for withdrawing reaction products from said catalyst tube assembly; means for circulating heated fluid around the external surface of said outer tubes at a temperature such that reactant fluids within said annular passageways are heated to the steam reforming reaction temperature; and support means located in the heating chamber and extending transversely thereof below said tubesheet, said outer tubes being in sliding engagement with said support means for maintaining said assemblies in their equally spaced, parallel relation without impairing the longitudinal expansion of said tubes aand without substantially affecting the circulation of the heated fluid.

3. A steam-hydrocarbon reformer comprising: an annular housing vertically oriented; a plenum in the upper portion of said housing; an insulated heating chamber below said plenum; means establishing a circulating heated fluid within said heating chamber for heating said chamber internally to the steam reforming reaction temperature; a tubesheet separating said plenum and said heating chamber; a plurality of catalyst tube assemblies mounted at their upper ends on and depending from said tubesheet and extending within said heating chamber parallel to one another and substantially the entire length of said heating chamber, each said tube assembly including an outer casing closed at the lower end thereof and open and affixed to said tubesheet at the upper end thereof, a removably mounted inner tube extending coaxially within said outer casing through the upper end thereof and terminating near the closed lower end of the outer casing, said inner tube being spaced from said outer casing and being held in a suspended condition therein by centering support means having securing points on said tubesheet independently of said outer casing, said inner tube dividing the internal space of the outer casing into a central passageway internally of the inner tube and an annular passageway between the outer surface of the inner tube and the outer casing, both passageways being in flow communication at the lower ends thereof, and said annular passageway being in flow communication with said plenum; a manifold contained within said plenum and being in flow communication by individual conduits to each of said central passageways; independently supported catalyst material carried on each of said inner tubes and extending circumferentially around a major portion of the outer surface of each of said inner tubes and spaced inwardly from said outer casings and forming a generally continuous surface defining the inner wall of each of said annular passageways; support means for said tube assemblies located in the heating chamber and extending transversely thereof below said tubesheet, said outer casings being in sliding engagement with said support means for maintaining said assemblies in their depending relationship without impairing the longitudinal expansion of said casings and without substantially affecting the circulation of the heated fluid; means for adding reactants to one of said plenum and said manifold; and means for withdrawing the reactant products from the other of said plenum and said manifold.

4. A reformer in accordance with claim 3 wherein said plurality of catalyst tube assemblies are located in said tubesheet such that each tube assembly is equally spaced from all immediately adjacent assemblies.

5. A reformer in accordance with claim 4 wherein said support means for said tube assemblies comprises a lattice receiving and holding in sliding engagement one of said assemblies in each of its interstices and being disposed at each of a plurality of regular intervals along the length of said tube assemblies.

6. A reformer in accordance with claim 3 wherein said centering support means that suspend said inner tubes within said casings through the upper ends thereof each having securing points on said tubesheet in common with at least one other such support means of an inner tube in an adjacent assembly.

7. A reformer in accordance with claim 3 wherein the independently supported catalyst material comprises a ceramic form impregnated with nickel oxide.

8. A reformer in accordance with claim 3 wherein said independently supported catalyst material comprises a plurality of discrete pellets stacked in a column, each of said pellets being in the form of a ring having an inside diameter substantially equal to the outside diameter of said inner tubes for forming a close fit thereon and wherein a ring spider is interspersed at each of several locations in the column of pellets along the length of said inner tubes for maintaining the coaxial relation of said inner tubes within each of said outer casings.

9. A reformer in accordance with claim 3 wherein said independently supported catalayst material comprises a plurality of discrete pellets stacked in a column, each of said pellets having a central ring core with an inside diameter substantially equal to the outside diameter of said inner tubes for forming a close fit thereon and with legs of equal length extending radially outwardly from the core for maintaining the coaxial relation of said inner tubes within each of said outer casings.

10. A reformer in accordance with claim 3 wherein said means for heating said chamber internally comprises fluid communication between said heating chamber and the heat of a high temperature fluid source affording the flow of a high temperature fluid through said chamber and circulation thereof axially of and around said plurality of catalyst tube assemblies suspended therein.

11. A reformer in accordance with claim 10 wherein the outer casing walls of said catalyst tube assemblies are of less outside diameter in the upper longitudinal portions thereof than in the remaining longitudinal portions for reducing flow resistance to the high-temperature fluid in a region where the circulation of the fluid changes from an axial flow along said tube assemblies to a crossflow thereof.

12. A reformer in accordance with claim 10 wherein the high temperature fluid source is a high temperature gas reactor.

* * * * *